E. C. TWINING.
HAY SLING APPARATUS.
APPLICATION FILED FEB. 10, 1912.

1,053,072.

Patented Feb. 11, 1913.

Witnesses

Inventor
E. C. Twining.

By ___ Attorneys

UNITED STATES PATENT OFFICE.

ERNEST C. TWINING, OF CLEMENTS, KANSAS.

HAY-SLING APPARATUS.

1,053,072.  Specification of Letters Patent.  Patented Feb. 11, 1913.

Application filed February 10, 1912. Serial No. 676,773.

*To all whom it may concern:*

Be it known that I, ERNEST C. TWINING, a citizen of the United States, residing at Clements, in the county of Chase and State of Kansas, have invented certain new and useful Improvements in Hay-Sling Apparatus, of which the following is a specification.

This invention relates to a peculiarly constructed platform adapted to support a hay sling below its surface, whereby on raking the hay on the platform and over the hay sling, the latter will not become entangled in the sweep rake but remain beneath the hay for hoisting into a barn or wagon as the case may be.

For a full understanding of the present invention, reference is to be had to the following description and to the accompanying drawings, in which—

Figure 1:
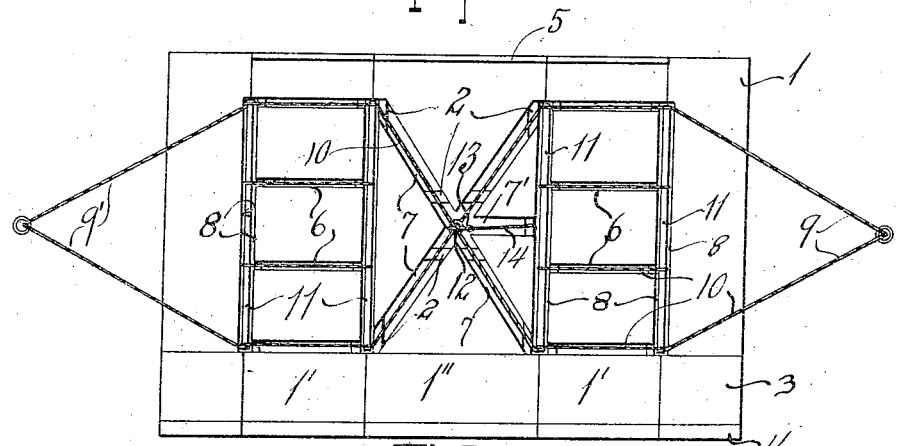
Figure 2:
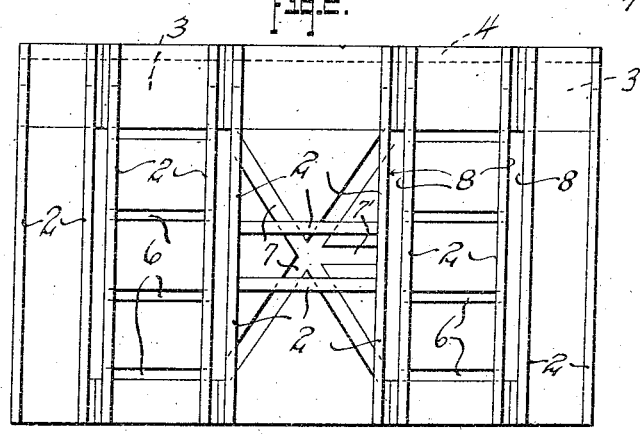
Figure 3:
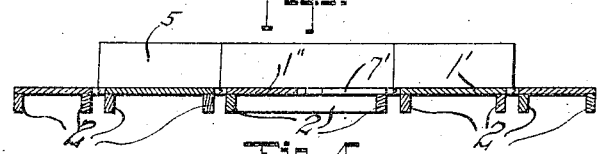
Figure 4:
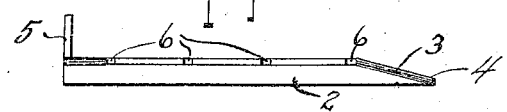
Figure 5:
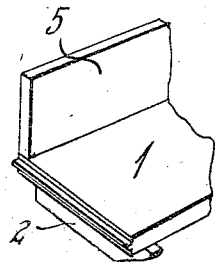

Figure 1 is a top plan view of the present invention having a hay sling applied thereto. Fig. 2 is a bottom plan view thereof. Fig. 3 is a longitudinal sectional view of the platform. Fig. 4 is a transverse sectional view thereof. Fig. 5 is a fragmentary perspective view of the rear portion of the platform.

Throughout the following detail description and on the several figures of the drawings, similar parts are referred to by like reference characters.

Referring more particularly to the drawings, 1 designates the platform or body, preferably constructed of sections, the edges of the sections being provided with tongues and grooves to afford a tight joint between the sections and rigidify the construction of the platform. Each section is provided with a pair of spaced frame members 2, running transverse to the platform, and the front edge of the platform is provided with a slope 3, up which the hay rake is adapted to move. The lower edge of the slope 3 is provided with a strip 4 of iron or other suitable metal to prevent the edge from wearing away under constant use.

Mounted on the rear edge of the platform is a vertically extending board 5 forming a stop for limiting the movement of the sweep rake and also positioning the latter properly over the hay sling for depositing the hay thereon.

The sections 1' are provided with a plurality of sling receiving openings 6 running longitudinally with respect to the platform and the central section 1'' is provided with diagonally running openings 7 connecting with certain of the openings 6. The central section 1' is also provided with the opening 7' running parallel with the openings 6. The adjoining edges of the sections are recessed, as at 8 so that, upon assembling the sections together, a plurality of transverse sling receiving openings are formed and are connected at one or more points with the openings 6 and 7.

The hay sling used in combination with the platform comprises two sections 9 and 9', each section comprising the flexible cables 10 and the rigid cross members 11. The latter lie in the transverse openings formed by the recesses 8 while the flexible portion of the hay sling is supported in the openings 6 and 7. The sections of the hay sling are detachably connected, as at 12, which connection may be broken by withdrawing the pin 13 with the rope 14, the latter lying in the opening 7' formed in the central section of the platform.

It will be noted that the flexible portion of the hay sling is supported on the frame members 2 while the cross bars 11 are unsupported, excepting through the remainder of the hay sling. By so mounting the hay sling, the weight of the cross bars will hold the ropes of the hay sling taut, thereby preventing any upwardly projecting loops which would, in all probability, become entangled in the hay rake as the latter mounts upon the platform.

Having thus described the invention, what I claim as new is:

1. A device for supporting a hay sling comprising a flat platform provided with transversely and longitudinally disposed slots adapted to receive portions of a sling in such a manner that they are below the surface of the platform, and an inclined guide at one edge of the platform, whereby a hay rake may be guided up on said platform to deposit its load on the sling carried by the latter.

2. A platform for hay slings comprising a plurality of sections, the central sections having openings therein and the adjoining edges of the sections being recessed to form other openings when the several sections are assembled.

3. In combination, a hay sling comprising a plurality of cables and spaced cross bars carried by the cables for holding the latter in spaced relation, a platform having a series of openings therein for receiving the cross bars, the platform also having a second series of openings to receive the cables, and cable supporting members spanning the second series of openings in the platform and disposed below the surface of the latter.

4. In combination, a hay sling comprising a plurality of cables and spaced cross bars carried by the cables to hold the latter in spaced relation, a platform for supporting the sling while hay is being deposited thereon, the platform comprising end and intermediate sections, the intermediate sections having transverse openings therein, frame members extending across the openings for supporting the cables of the sling therein, and stop members carried by the intermediate sections, the adjoining edges of the sections of the platform being provided with recesses which form openings, when the sections are assembled, to receive the cross bars of the sling.

In testimony whereof I affix my signature in presence of two witnesses.

ERNEST C. TWINING.

Witnesses:
JAMES BLUNT,
CHARLES C. DEERING.

Copies of this patent may be obtained for five cents each, by addressing the "Commissioner of Patents, Washington, D. C."